United States Patent
Kellam et al.

(10) Patent No.: US 10,435,313 B2
(45) Date of Patent: Oct. 8, 2019

(54) SYSTEMS, DEVICES, AND METHODS OF WATER FILTRATION

(71) Applicant: ZERO TECHNOLOGIES, LLC, Trevose, PA (US)

(72) Inventors: Doug Kellam, Oak Brook, IL (US); Rajan Rajan, Bensalem, PA (US); Liu Guang Wei, Cixi (CN); Ajit Dighe, Northville, MI (US); Charles Lieppe, Delray Beach, FL (US)

(73) Assignee: ZERO TECHNOLOGIES, LLC, Trevose, PA (US)

( * ) Notice: Subject to any disclaimer, the term of this patent is extended or adjusted under 35 U.S.C. 154(b) by 670 days.

(21) Appl. No.: 14/775,193

(22) PCT Filed: Mar. 17, 2014

(86) PCT No.: PCT/US2014/030201
§ 371 (c)(1),
(2) Date: Sep. 11, 2015

(87) PCT Pub. No.: WO2014/145435
PCT Pub. Date: Sep. 18, 2014

(65) Prior Publication Data
US 2016/0031724 A1    Feb. 4, 2016

Related U.S. Application Data

(60) Provisional application No. 61/793,580, filed on Mar. 15, 2013.

(51) Int. Cl.
*C02F 1/42*    (2006.01)
*B01D 24/12*    (2006.01)
(Continued)

(52) U.S. Cl.
CPC ............. *C02F 1/42* (2013.01); *B01D 24/12* (2013.01); *B01D 24/22* (2013.01); *B01D 24/38* (2013.01);
(Continued)

(58) Field of Classification Search
CPC ........ C02F 1/42; C02F 1/003; C02F 2305/14; C02F 2303/24; C02F 2201/006;
(Continued)

(56) References Cited

U.S. PATENT DOCUMENTS 2,935,194 A * 5/1960 Tomkin ................ G01N 31/221
                                                           122/379
5,637,214 A    6/1997   Kahana
(Continued)

FOREIGN PATENT DOCUMENTS

| | | |
|---|---|---|
| JP | 3017701 U | 11/1995 |
| JP | 2005342684 A | 12/2005 |
| WO | 2010055848 A1 | 5/2010 |

OTHER PUBLICATIONS

International Preliminary Report on Patentability in International Application No. PCT/US2014/030201, dated Sep. 15, 2015.
(Continued)

*Primary Examiner* — Lucas A Stelling
*Assistant Examiner* — Angel Olivera
(74) *Attorney, Agent, or Firm* — J. A. Lindeman & Co. PLLC; Jeffrey Lindeman; Joseph Parisi

(57) ABSTRACT

Systems, devices, and methods of filtering water include a dome shaped lid and middle disk to separate filtration media materials. The domed shaped lid eliminates air locks in the filter media that can slow or stop the filtration process. A flow control output port regulates the flow level and flow speed of the filtered water. An angled flow output port improves flow by accelerating flow at an angled bottom
(Continued)

Section A-A section of the filter. Water permeable filter bag materials house the filter media. An additional washing process improves the taste of the filtered water. A color change resin in the mixed bed resin indicates expiration of the filter. Similarly, a filter expiration indicator assists users in determining when a filter should be replaced. An integrated TDS meter is used for testing the filtered water. The devices can be used individually or in combination to provide performance improvements.

20 Claims, 12 Drawing Sheets

(51) Int. Cl.
| | |
|---|---|
| *B01D 24/22* | (2006.01) |
| *B01D 24/38* | (2006.01) |
| *C02F 1/00* | (2006.01) |
| *B01D 35/30* | (2006.01) |
| *C02F 1/28* | (2006.01) |
| *C02F 1/66* | (2006.01) |
| *C02F 9/00* | (2006.01) |
| *C02F 1/44* | (2006.01) |
| *C02F 101/00* | (2006.01) |
| *C02F 101/12* | (2006.01) |
| *C02F 101/30* | (2006.01) |

(52) U.S. Cl.
CPC .............. *C02F 1/003* (2013.01); *B01D 35/30* (2013.01); *B01D 2201/291* (2013.01); *B01D 2201/64* (2013.01); *C02F 1/283* (2013.01); *C02F 1/444* (2013.01); *C02F 1/66* (2013.01); *C02F 9/005* (2013.01); *C02F 2001/427* (2013.01); *C02F 2101/006* (2013.01); *C02F 2101/12* (2013.01); *C02F 2101/30* (2013.01); *C02F 2201/005* (2013.01); *C02F 2201/006* (2013.01); *C02F 2303/24* (2013.01); *C02F 2305/14* (2013.01); *C02F 2307/04* (2013.01)

(58) Field of Classification Search
CPC ............ C02F 2201/005; C02F 2101/30; C02F 2307/04; C02F 2101/006; C02F 2001/427; C02F 1/66; C02F 1/444; C02F 1/283; C02F 2101/12; C02F 9/005; B01D 24/12; B01D 24/22; B01D 24/38; B01D 24/4861; B01D 24/4869; B01D 27/08; B01D 27/10; B01D 27/108; B01D 29/603; B01D 29/605; B01D 35/027; B01D 35/0276; B01D 35/30; B01D 35/34; B01D 2201/16; B01D 2201/20; B01D 2201/29; B01D 2201/291; B01D 2201/30; B01D 2201/31; B01D 2201/64
See application file for complete search history.

(56) References Cited

U.S. PATENT DOCUMENTS

| | | | | |
|---|---|---|---|---|
| 5,665,224 | A | * | 9/1997 | Levene ................ B01D 24/042 210/282 |
| 5,707,527 | A | * | 1/1998 | Knutson ................ B01D 29/15 210/170.03 |
| 5,811,004 | A | * | 9/1998 | Robertson ............... C02F 1/003 210/266 |
| 6,524,477 | B1 | | 2/2003 | Hughes |
| 6,841,067 | B1 | | 1/2005 | Hofmann et al. |
| 8,097,159 | B1 | * | 1/2012 | Peng ....................... C02F 1/003 210/244 |
| 8,252,185 | B2 | | 8/2012 | Rajan et al. |
| 2009/0166273 | A1 | * | 7/2009 | Mormino .................. C02F 1/42 210/107 |
| 2011/0290741 | A1 | | 12/2011 | Cueman et al. |
| 2012/0061313 | A1 | * | 3/2012 | Swain ..................... C02F 1/003 210/472 |

OTHER PUBLICATIONS

International Search Report and Written Opinion in International Application No. PCT/US2014/030201, dated Aug. 8, 2014.
Extended European Search Report in Application No. EP 18150830.0, dated Apr. 5, 2018.

* cited by examiner

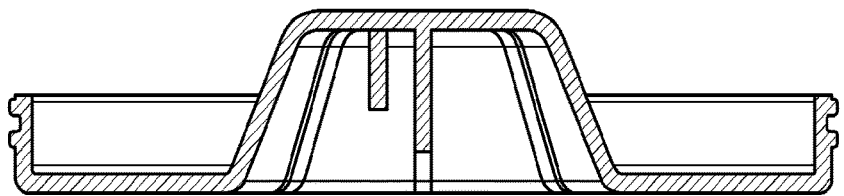
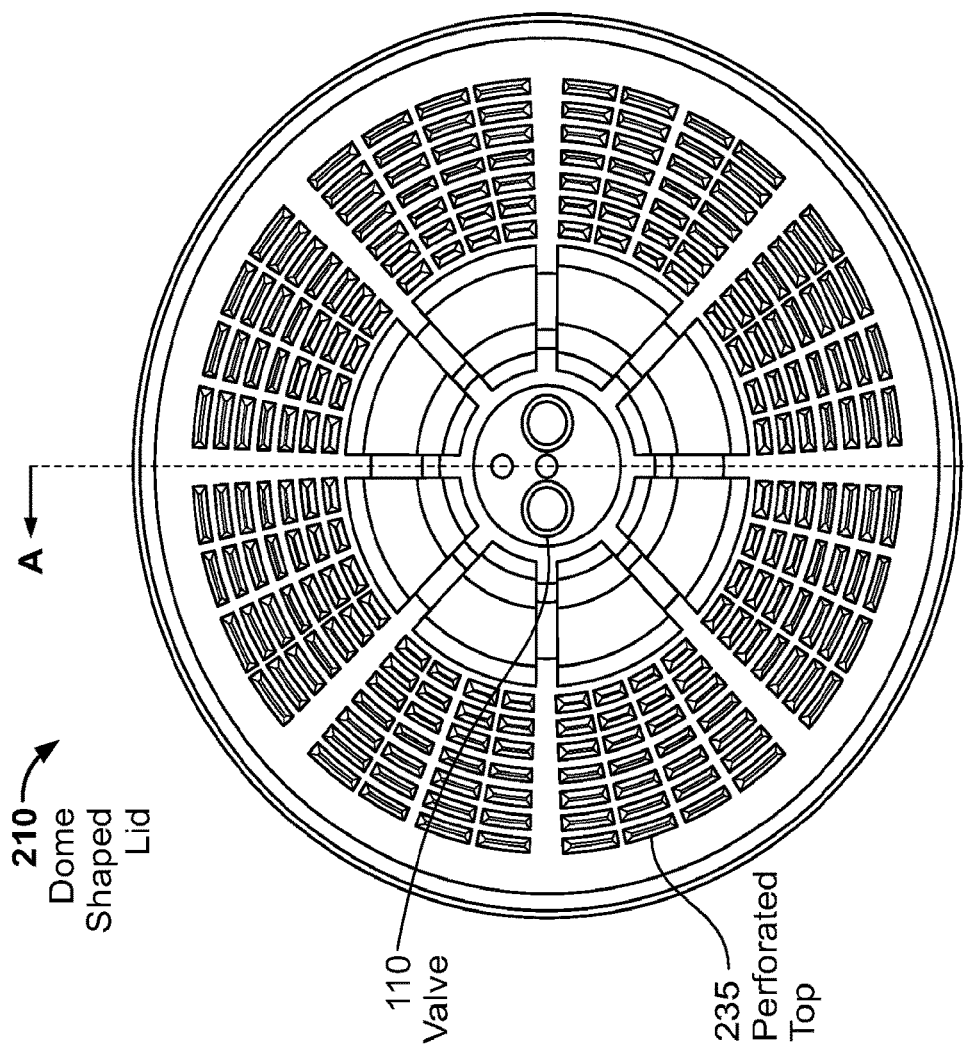

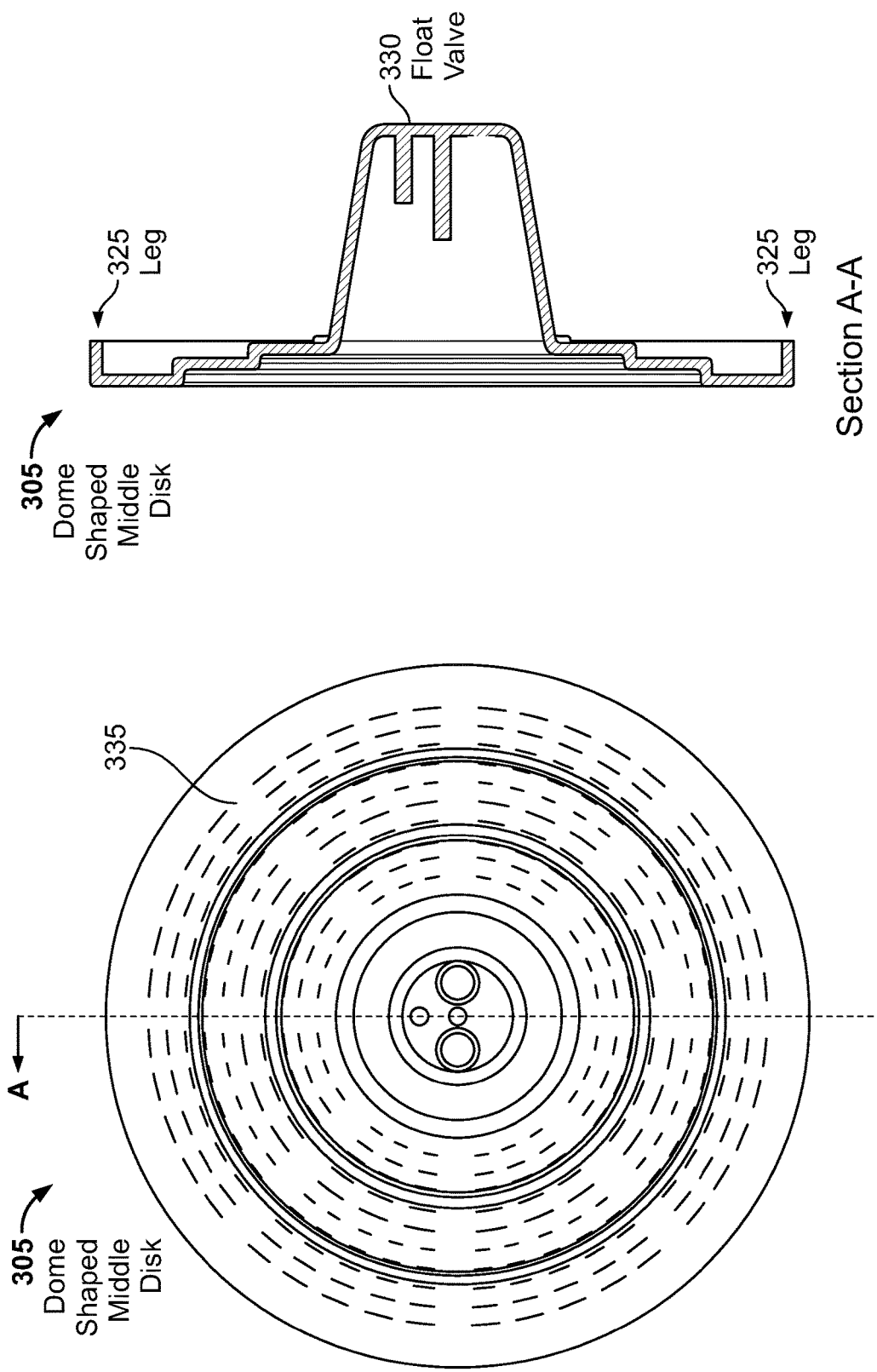

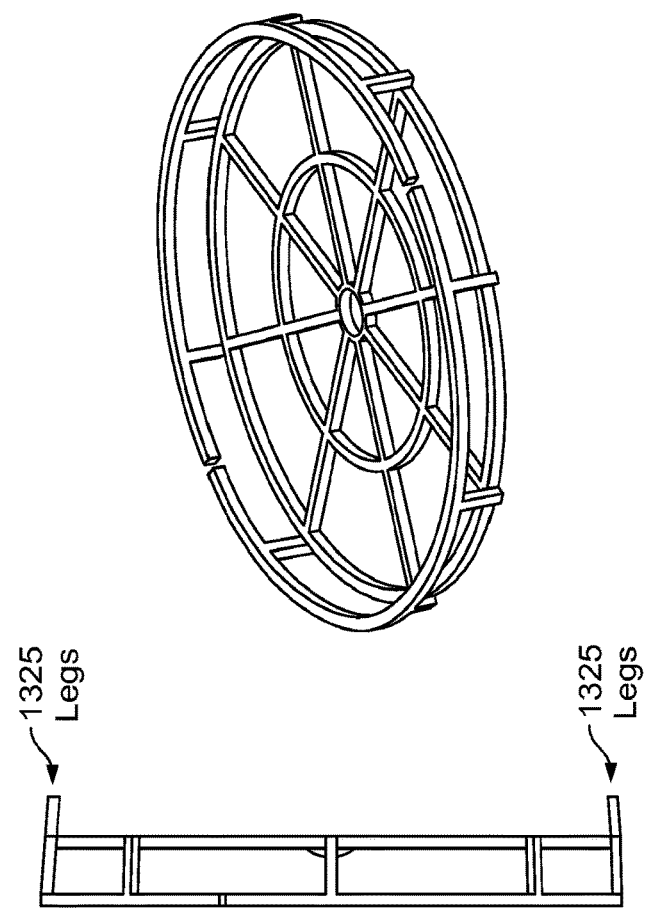
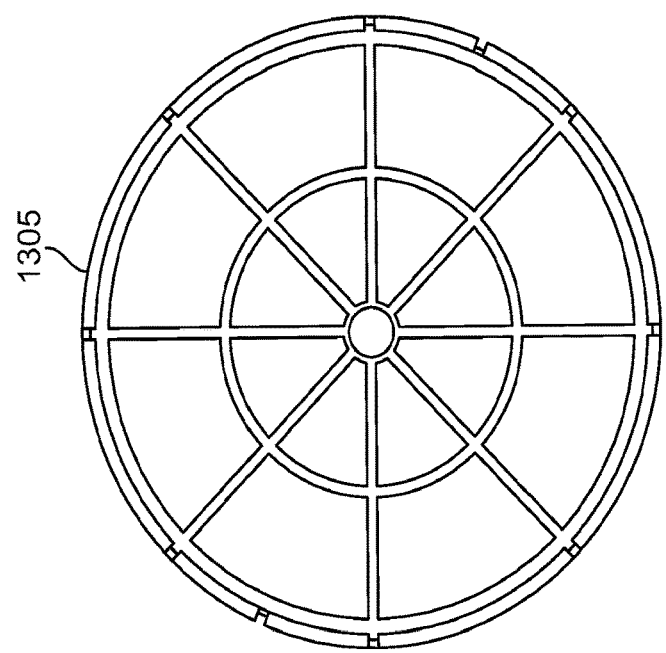
FIG. 3D

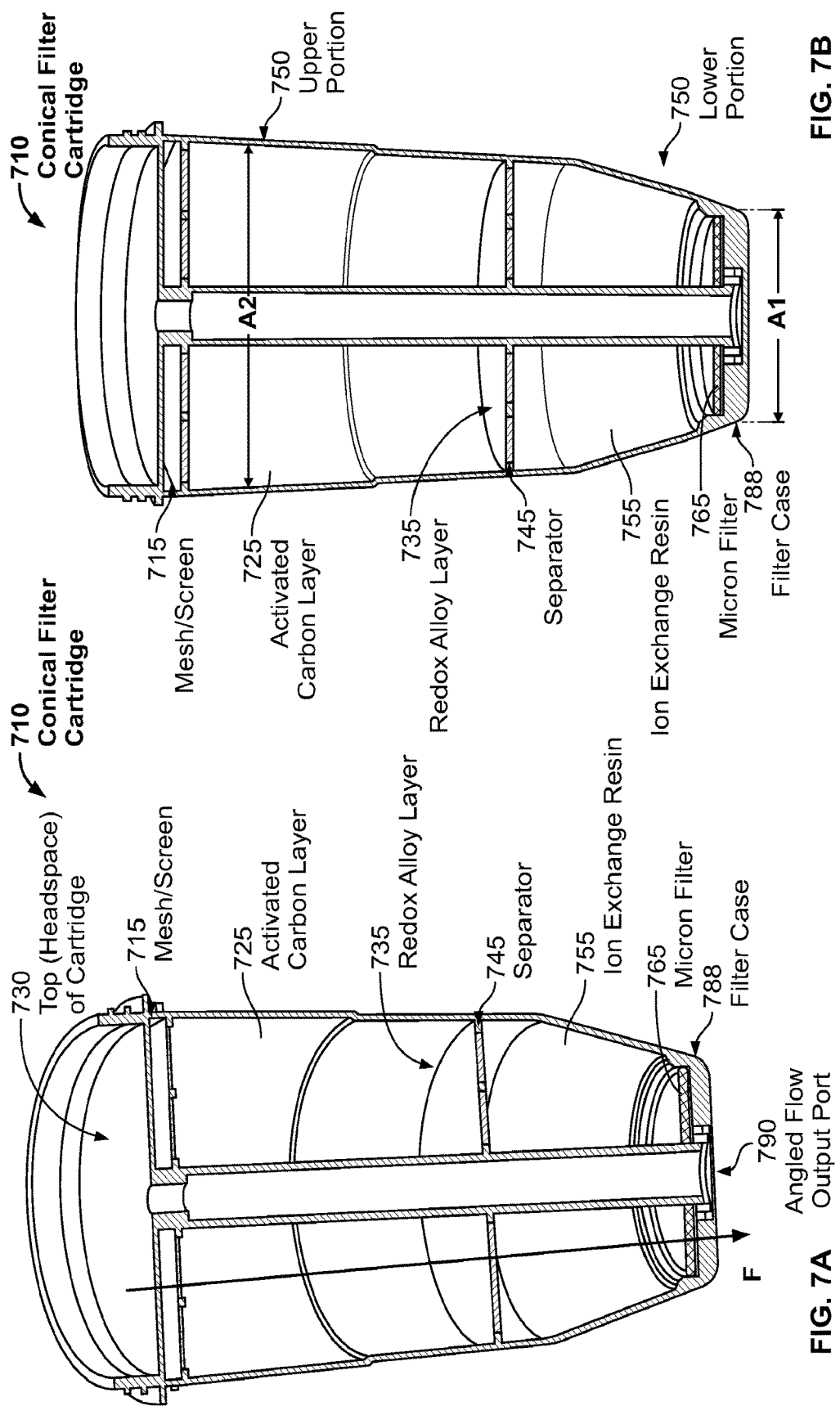

SYSTEMS, DEVICES, AND METHODS OF WATER FILTRATION

CROSS-REFERENCE TO RELATED APPLICATION

This application claims benefit of priority of U.S. Provisional Patent Application Ser. No. 61/793,580 filed on Mar. 15, 2013, the entire disclosure of which is incorporated herein by reference.

TECHNICAL FIELD

This technology relates to systems and methods of water filtration. More particularly, the technology relates to systems, devices, and methods of controlling the flow and velocity of water in filter chambers.

BACKGROUND

Sources of drinking water can be naturally contaminated with biological impurities and can also be contaminated by chemical and other non-naturally occurring sources.

Water purification removes undesirable chemicals, biological contaminants, suspended solids, and gases from contaminated water to make the water suitable for drinking Purification can include physical processes such as filtration, sedimentation, and distillation, biological processes such as slow sand filters or biologically active carbon, chemical processes such as flocculation and chlorination and the use of electromagnetic radiation such as ultraviolet light.

Water filtration systems can include pour-through pitcher systems, countertop systems, and filtration cartridge systems to purify the water. Pour-through pitcher systems can include an upper reservoir for receiving unfiltered water, a lower reservoir for receiving and storing filtered water, and a filtration cartridge with an inlet at its top and outlet at its bottom, through which water flows from the upper reservoir is filtered and travels to the lower reservoir.

Countertop or standalone systems can include a larger filtered water tank with a spigot for draining filtered water into a glass or other container. Pitcher and countertop systems use gravity to move the unfiltered water in the top reservoir through a water filtration cartridge and into the lower reservoir where the filtered water is stored until it is used.

Water filtration cartridges often used in gravity flow systems often include a sieve system and a housing. The housing is filled with filtration media, and the sieve system is sealed to the barrel. The filtration media is usually granular, such as activated carbon. Other components can be combined to enhance water filtration capability, such as ion exchange resin, zeolite, ceramics, and the like.

A problem associated with using granular filtration media in gravity flow cartridges is that air gets trapped in-between the particles of filtration media and in the headspace of the cartridge housing. Air can enter into the cavities of the water flow path when the filter is not used for a period of time. When the filter is again used to filter the liquid, the heavier liquid traps the lighter air in the cavities of the filter, especially close to the underside of the filtration media. This "headspace" area between the fill line of the filtration media and the underside of the filtration media provides a back pressure and a loss of filtration surface area. Both "air lock" effects contribute to the reduction in the flow rate of the liquid through the filter. This air must be vented or otherwise removed from the cartridge as water is filtered or water flow will be slow or completely stop.

SUMMARY

The devices and methods of the claimed invention provide improvements in filter performance, including reducing air-locks, providing better flow characteristics, separating filter elements, removing total dissolved solids, improving taste, and providing simple and effective ways to determine when a filter is no longer effective and needs to be replaced. The dome shaped lid and domed shaped middle disk in accordance with the claimed invention prevent clogging of the filters due to air-locks that can be created in the filter when air is drawn into the filter as the filtering water drains. This can occur when a container, such as a water container, for example, is emptied, and the water level in the container no longer covers the entire filter medium. Air-locks can also occur when gaps are created in the filter elements. When water is poured into the filter, air can become trapped and create air-locks in the filter elements. The dome shaped lid, domed shaped middle disk and associated filtration devices of the claimed invention eliminate air-locks and clogging of the filter elements by routing air bubbles up and away from the filter. Improved filter efficiency also is created by eliminating shifting of the filtration layers, as this provides a more uniform usage of the filter medium.

A number of example embodiments of the claimed invention can be used to provide improved filtration. A dome shaped lid eliminates air-locks in the filter, and a dome shaped middle disk ensures that the filter elements remain separate. A flow control output port regulates the flow level and flow speed of the filtered water as well as the "dwell time" of the water in the filter layers. An angled flow output section provides improved flow characteristics by accelerating water flow through the filter. New water permeable filter bag materials are used to house the filter media. An additional washing process provides greater filter longevity and improved taste even as the filter begins to expire. A color change resin in a mixed bed resin of the filter provides a visual indication that the filter is expired. The color change resin assists users in determining when a filter should be replaced. Additionally, an improved TDS (total dissolved solids) meter is incorporated into water pitchers and other dispensers for use in testing the filtered water. The devices can be used individually or in combination to provide performance improvements in both new and existing filter cartridges.

One example embodiment of the claimed invention is a water filter that includes a water head layer, a filter layer, and a dome shaped lid. The water head layer receives unfiltered water and facilitates the flow of water through a filtration medium. The filter layer houses the filtration medium that filters the unfiltered water as the unfiltered water passes through the filtration medium. The dome shaped lid is on top of the water head layer and the filter layer. The dome shaped lid is configured to move with the water head layer as the water head layer receives unfiltered water and the unfiltered water passes through the filter layer. The water head layer is up when the filter is full of water, and moves down as the water flows through the filter.

In one example embodiment of the claimed invention, the dome shaped lid includes a float valve that opens and closes as the water level of the water head layer rises and falls. The dome shaped lid can also include a vent through which air from the filter escapes as the dome shaped lid moves up and down with the water head layer. This vent prevents and eliminates air locks in the filter.

The filter medium can include a carbon layer, a redox alloy layer, an ion exchange layer, and/or a micron filter layer. The carbon layer removes chlorine and/or organic contaminants from the unfiltered water. The redox alloy layer neutralizes pH in the water, and the ion exchange layer removes inorganic and/or radiological contaminants in the water. The water filter can also include a porous separator and/or a screen for removing impurities from the water and for regulating water flow through the filtration medium. The water filter can also include a flow control output port. The flow control output port can have a smaller cross sectional area than a water head layer of the water filter. Additionally, the ion exchange layer can include a mixed bed of cationic and anionic resins. The ion exchange layer can also include a water softener and/or a color change resin.

In some example embodiments, the water filter is a gravity-fed filter. Some embodiments include a water filter that also includes a food safe foam that is configured to prevent filter medium spillage out of the filter and to provide even water flow at the filter layer.

Some example embodiments of the claimed invention include a filter with a middle disk in the filter medium that provides rigidity and stability. The middle disk can be used to separate the filter media layers. The middle disk can include legs that extend from a planar portion of the middle disk. The legs of middle disk can extend from an outermost point of the planar portion of the middle disk, such as the circumference of a round middle disk, to provide vertical stability for the middle disk. The middle disk can also include a float valve.

BRIEF DESCRIPTION OF THE DRAWINGS

FIG. 2A shows a dome-shaped top cap in accordance with the claimed invention.

FIGS. 2B is a cross-sectional view of the dome-shaped top cap of FIG. 2A along axis A-A.

FIGS. 3A and 3B show a dome shaped middle disk in accordance with the claimed invention.

FIG. 3D illustrates an anti-twisting middle disk in accordance with the claimed invention.

FIGS. 7A and 7B show cross-sectional views of an example multi-stage filter in accordance with the claimed invention.

DETAILED DESCRIPTION

A number of example embodiments of the claimed invention can be used to provide improved filtration. A dome shaped lid eliminates air-locks in the filter, and a dome shaped middle disk ensures that the filter elements remain separate. A flow control output port regulates the flow level and flow speed of the filtered water as well as the "dwell time" of the water in the filter layers. An angled flow output section provides improved flow characteristics by accelerating water flow through the filter. New water permeable filter bag materials are used to house the filter media. An additional washing process provides greater filter longevity and improved taste even as the filter begins to expire. A color change resin in the mixed bed resin indicates expiration of the filter. Similarly, a filter expiration indicator assists users in determining when a filter should be replaced. An improved TDS (total dissolved solids) meter is incorporated into water pitchers and other dispensers for use in testing the filtered water. The devices can be used individually or in combination to provide performance improvements in both new and existing filter cartridges.

Double Domes

Figure 1A:
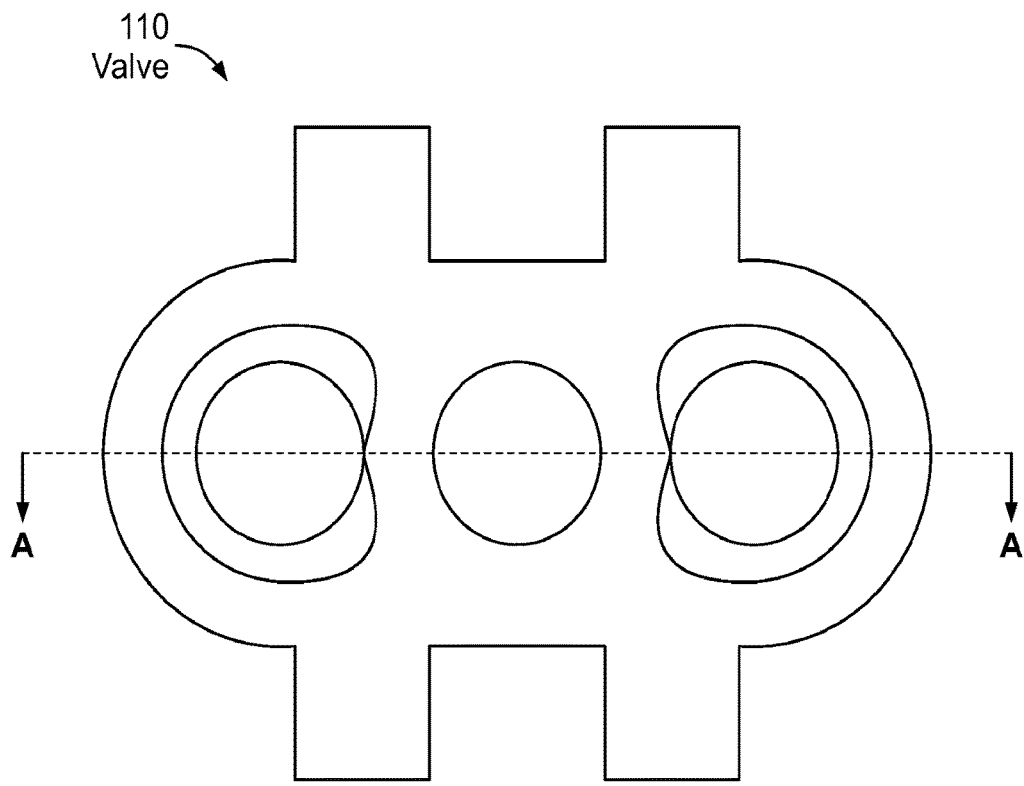
FIG. 1A shows a double dome float valve configuration in accordance with the claimed invention.
Figure 1B:
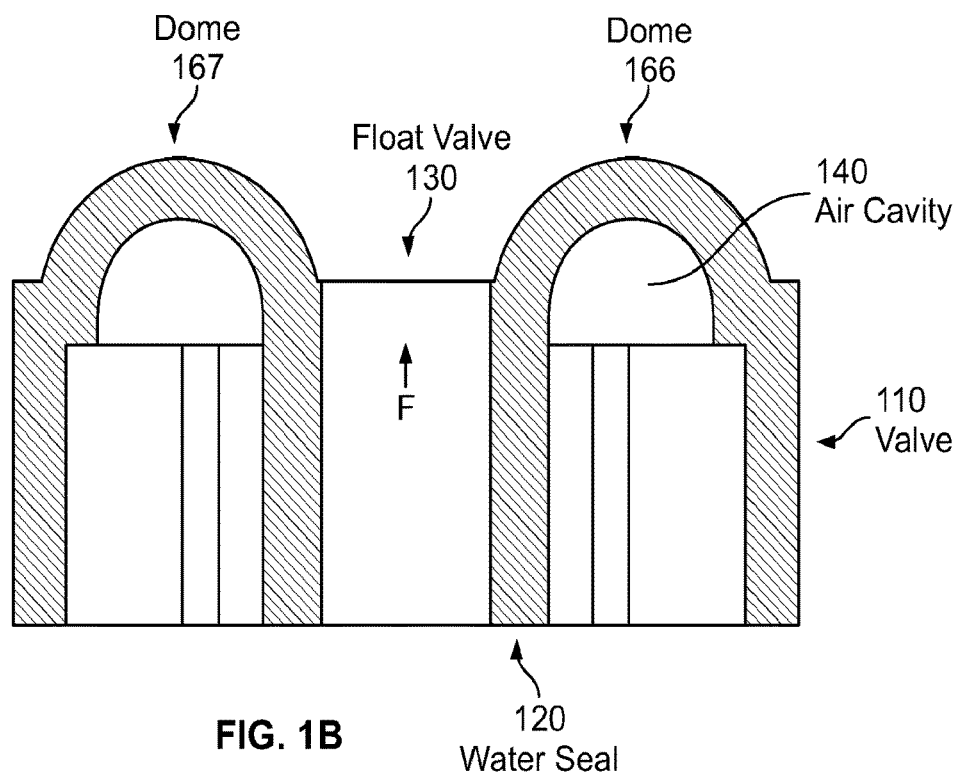
FIG. 1B is a cross-sectional view of the float valve of FIG. 1A along axis A-A.

One embodiment of the claimed invention is shown in FIGS. 1A and 1B and includes a valve 110 for use in a dome shaped lid 210 (shown in FIG. 2B). The dome shaped lid 210 and a dome shaped middle disk 305 shown in FIGS. 3A and 3B provide a double dome filter configuration. The combination of the valve 110 in the dome shaped lid 210 and the dome shaped middle disk 305 works to eliminate filter air-locks. The dome shaped lid 210 and the dome shaped middle disk 305 concentrate rising air at key points of likely air-locks in the filter. By allowing air in the filter to escape through holes (vent) at the top of the domes, air locks in the filter are prevented, and unfiltered water can pass through the filter layers unfettered. Eliminating air locks in the filter provides faster water filtration as well prevents channeling within the filter. Channeling occurs when the water or other liquid passes through a less-resistant path of the filter media. That is, a channel is formed within the filter media by repeated flow through a particular area with reduced contact time with the components of the filter media.

FIG. 2A also illustrates a top view of the dome shaped lid 210 and valve 110, while FIG. 2B shows a cross section of the dome shaped lid 210 along line A-A of FIG. 2A. The dome shaped lid 210 with valve 110 can be installed on a filter (not shown separately) to provide a permeable seal to help keep water in the filter while preventing air locks. Unfiltered water is added through the perforated top 235 and progresses through the filter (not shown separately). As the water level of the filter or filter cartridge rises and falls, the valve 110 rises and falls with the water level. That is, the domes 166, 167 of the dome shaped lid 210 ride up and down with the height of the water level, and the float valve 130 between the domes 166, 167 remains stationary (with respect to the domes 166, 167).

Initially, the domes 166, 167 are at the bottom of the dome shaped lid 210, and the valve 110 is open, allowing air to pass through. As unfiltered water is added to the filter, the unfiltered water flows through perforated top 235 to reach (the first layer of) the filtration media.

Once the water passes through the perforated top 235 and reaches the filtration media, the unfiltered water forms a head space layer on the top of the filtration media. As shown in FIG. 1B, the water of the head space layer exerts an upward force (shown as direction F) on the valve 110 at the water seal layer 120. When the water level reaches the vent 155, the domes 166, 167 are raised and the float valve 130 is closed. As the water makes its way through the filter, the domes 166, 167 float down with water level, and the air is let out the vent 155. As the water level rises, the air continues to escape via vent 155 until the water level is at the top of the filter and the vent 155 is closed.

Additionally, when there is a significant air bubble present, the valve 110 moves downward as there is less water pressure pushing up at the water seal layer 120. This allows the free flow of air out of the filter (not shown separately) eliminating air-bubbles in the filter and the flow constriction or channeling that often follows as a result. The float valve 130 thereby provides a mechanism that changes the way air flows into and out of the filter.

Figure 4:
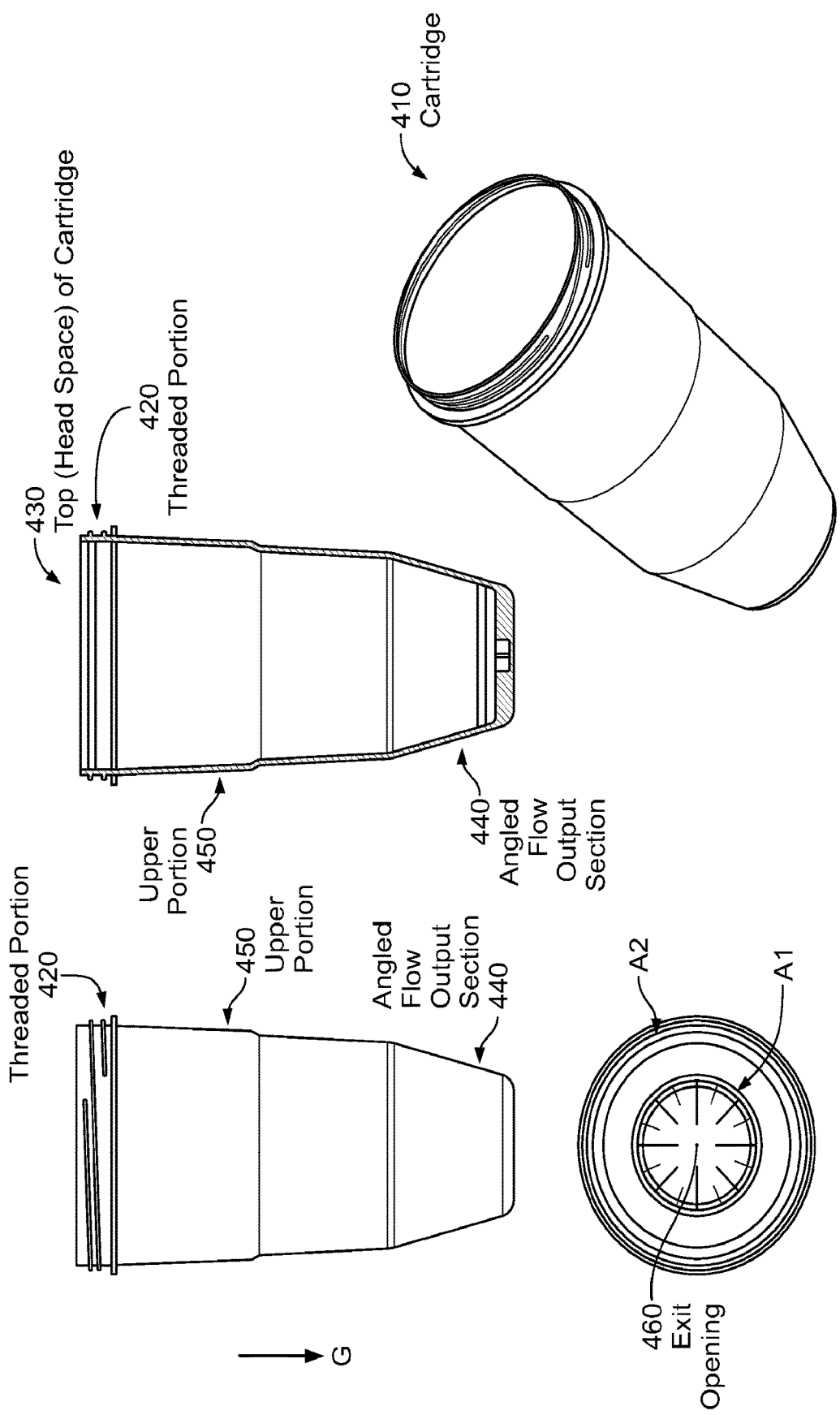
FIG. 4 shows a conical filter cartridge in accordance with the claimed invention.

By regulating the flow of air into and out of the filter using the valve (assembly) 110 and float valve 130, no air-locks are allowed to develop in the filter, and water flows through the filter at a predictable and consistent rate. The valve 110 can be used with a number of filters, including cylindrical filters, conical filters (for example, as shown in FIG. 4), and the like. Users and consumer benefit from a dramatically more consistent flow rate and elimination of air-locks in the filter.

Figure 3C:
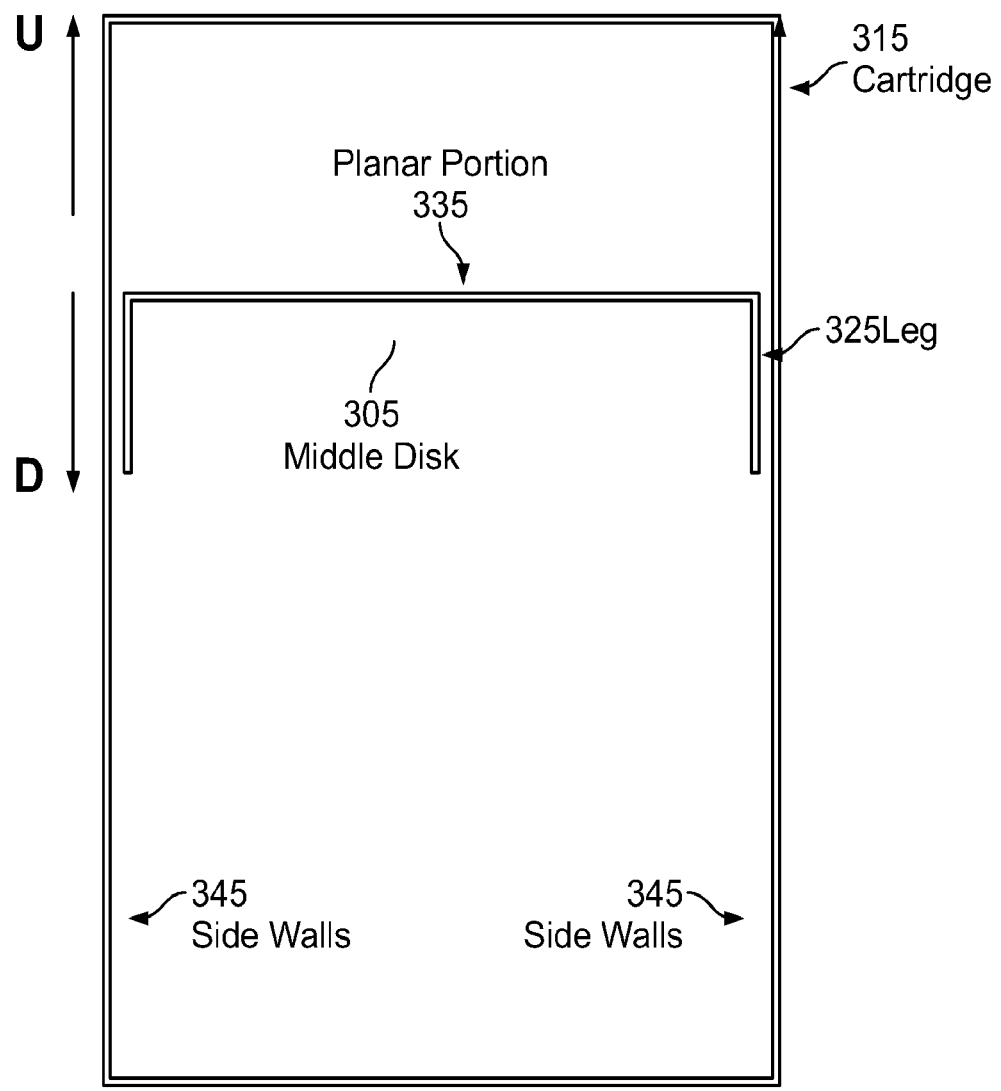
FIG. 3C illustrates the floating action of the middle disk in accordance with the claimed invention.

Similarly, the dome shaped middle disk 305 shown in FIGS. 3A-3D can be used to provide rigidity and stability in the filter medium (media) in a filter cartridge. Additionally, dome shaped middle disk 305 can be used to separate different filter media layers. For example, the dome shaped middle disk 305 can be used to separate carbon and ion exchange resin layers in the filter 315. The dome shaped middle disk 305 of FIG. 3A functions as an anti-twist middle disk, but the middle disk can be used with or without the float valve 330 similar to the float valve 130 of FIG. 1. For example, an anti-twist middle disk 1305 is shown in FIG. 3D, with similarly extending legs 1325 that provide vertical stability for the horizontal disk 1305.

For illustrative purposes, the reference numerals in the following description refer to the example embodiments of FIGS. 3A-3C that use a float valve 330, but the disk and legs depicted in FIG. 3D is equally applicable. As shown schematically in FIG. 3C, the legs 325 of the middle disk 305 extend vertically along the wall 345 of the filter 315. In doing so, the legs 325 keep the planar perforated portion 335 of middle disk 305 perpendicular to the side walls 345 of the filter 315 (cartridge), yet allow for upward and downward movement along directional arrows U and D in FIG. 3C as the elements of the filter (including carbon and ion exchange resin layers—not shown separately) expand and contract with moisture. This upward and downward movement of the middle disk 305 helps control open "air space" within the filter 315 (cartridge) and keep the filter media elements separated. The integrity of the filter is maintained as air bubbles are not created in the filter and no air-locks are formed. Water flows through the filter 315 in an efficient pattern that utilizes the maximum surface area of the filter elements. Additionally, a food safe foam material can be added to the various filter cartridges to avoid carbon spillage out of the filter while helping provide even water flow at the top of filter.

Flow Control Output Port

The devices of the claimed invention also include a conical filter output and a flow control output port to regulate the flow level and flow speed of the filtered water. A conical filter cartridge 410 in accordance with the claimed invention is shown in FIG. 4. A cross-section of the filter cartridge 710 is also shown in FIGS. 7A and 7B. An additional exploded view of the filter cartridge is shown in FIG. 8. The conical filter cartridge 410, 710 is attached to a container (not shown) such as a water pitcher, water bottle, and the like using threaded top portion 420. The conical filter cartridge 410, 710 can be attached to an unfiltered water reservoir of a pitcher, bottle, and the like. Unfiltered water is poured in to the top 430, 730 of the cartridge 410, 710 and flows down and through the cartridge 410, 710 in the direction shown by reference arrow G in FIG. 4 and in the direction shown by reference arrow F in FIG. 7A. When conical filter cartridge 410, 710 receives water from an unfiltered water reservoir, the unfiltered water moves from the unfiltered water reservoir to the top 430, 730 (head space) of the cartridge 410, 710 and flows down and through the cartridge 410, 710 in the direction shown by reference arrow F in FIG. 7A. A lower portion 760 of the filter cartridge, includes angled flow output section 440 of the cartridge 410, 710 has a smaller cross sectional area A1 than the cross sectional area A2 of the upper portion 450, 750 of the cartridge 410, 710. As such, the flow rate of the water through area A1 is greater than the flow rate of the water through area A2. That is, the water accelerates through area A1. The size relationship of area A1 to A2 can be varied depending upon the desired output flow rate. The flow rate through the respective sections 440, 450 (and 760, 750) will be inversely proportional to the cross sectional areas of those sections.

Additionally, the exit opening 460 (angled flow output port 790) of the cartridge 410, 710 can also be used to regulate the flow speed of water leaving the cartridge 410, 710 and collecting in the container or in a filtered water reservoir. For example, when pouring unfiltered water into the top 430, 730 (head space) of the cartridge 410, 710 (or receiving unfiltered water from an unfiltered water reservoir) with a gravity flow through the cartridge 410, 710 an exit opening 460 (angled flow output port 790) with a hole size of 0.063 inches results in a flow rate of filtered water into the container of approximately 180-200 cc/minute. When combined with the improved flow enhancements, this exit opening 460 (angled flow output port 790) in the filter shell case 788 is a primary determinant of flow rate of the filtered water. The conical geometry of the cartridge 410, 710, and in particular the exaggerated angle of the conical shape in section 440, 760 accelerates the water flow speed, which helps draw water through the wider top of the filter cone (upper portion 450, 750) where air bubbles are more likely to slow the flow without this added drawing power. This then leads to a more consistent output of the filter cartridge 410, 710 through exit opening 460 (angled flow output port 790), leaving the exit opening 460 (angled flow output port 790) as the primary determinant of flow rate through the filter cartridge 410, 710.

By removing other barriers to controlling flow rate and accurately controlling the flow rate through the size and number of exit openings, the "dwell time" of water within the mixed bed of ion-exchange resin 755 in the filter cartridge can be accurately controlled, along with the dwell time within other layers within the filter as a whole. For example, the exit opening 460 (angled flow output port 790) of the cartridge 410, 710 can be used to regulate the dwell time of the water with carbon filter layers, ion-exchange resin layers, and other filter layers of the cartridge. Cartridges with water output openings at positions and locations at any part of the cartridge can use the size of the opening to regulate the performance of the filter as well.

This carefully managed flow rate and dwell time is used to maximize the performance and the efficient use of the mixed bed of ion exchange resin. The systems and methods of the claimed invention maintain a dwell time of a minimum of 3 to 4 minutes in order to remove all dissolved inorganic solids to a level of 0 parts per million when measured by an electronic TDS meter. Even with this dwell time, the systems and methods of the claimed invention can provide an acceptable flow rate (minimum flow of 100 cc per minute). The mixed bed of ion exchange resin provides improved performance as the elimination of all measurable dissolved solids (with a standard TDS meter) is a feature and benefit of the system. The mixed bed includes an approximate 50/50 mix of anion and cation resins, which will remove all positively and negatively charged ions from the filtered water molecules (measurable to level of 0 parts per million). The range of anion/cation mix is within the 48-52% mix for each for optimum efficiency and maximum amount of water filtered before the resin's potency expires.

This optimum dwell time and flow rate can be managed accurately though the size and number of exit holes, with the exit holes being a primary determinant of flow rate. Other elements of the filter provide optimal filtration performance.

Filter Layers

As shown in FIGS. 7A, 7B, 7C, and 8, filter cartridge 710 can be manufactured as a polypropylene outer case within which the filter media, screens, and/or separators are housed. Though the discussion below and the exemplary figures refer to certain filter media for the exemplary embodiments, any filter media (media known for purification and treatment of water) or combinations of filter media known in the art can be used in this invention. The filter media are chosen, dependent on the requirements of the water purification quality, from sorption means (e.g., activated carbon, synthetic zeolite, schungite, and the like); ion exchange means (e.g., ion exchange resins and the like), porous means (e.g., polypropylene, porous glass beads or frits, filter paper, and the like), catalytic means (e.g., KDF and the like), a disinfecting resin (e.g., iodine resin and the like) and mixed media combining properties of means of different composition. Filter media can be selected and used to remove impurities such as bacteria, heavy metals, chlorine, organic impurities, inorganic impurities, radiological impurities, and the like. The filter media may be in the form of beads, powders, granules, formed between porous membranes or other forms known in the art. Examples of such filter media are described in U.S. Pat. Nos. 8,252,185; 7,413,663; 7,276,161; 7,153,420; 6,752,768; and 5,635,063; all of which are incorporated herein by reference. The filter media may be separated into individual layers or mixed together as a whole or with different combinations of filter media being included as different layers. The filters of the invention can contain more than one layer of a particular filter media or filter media mixture.

Figure 7C:
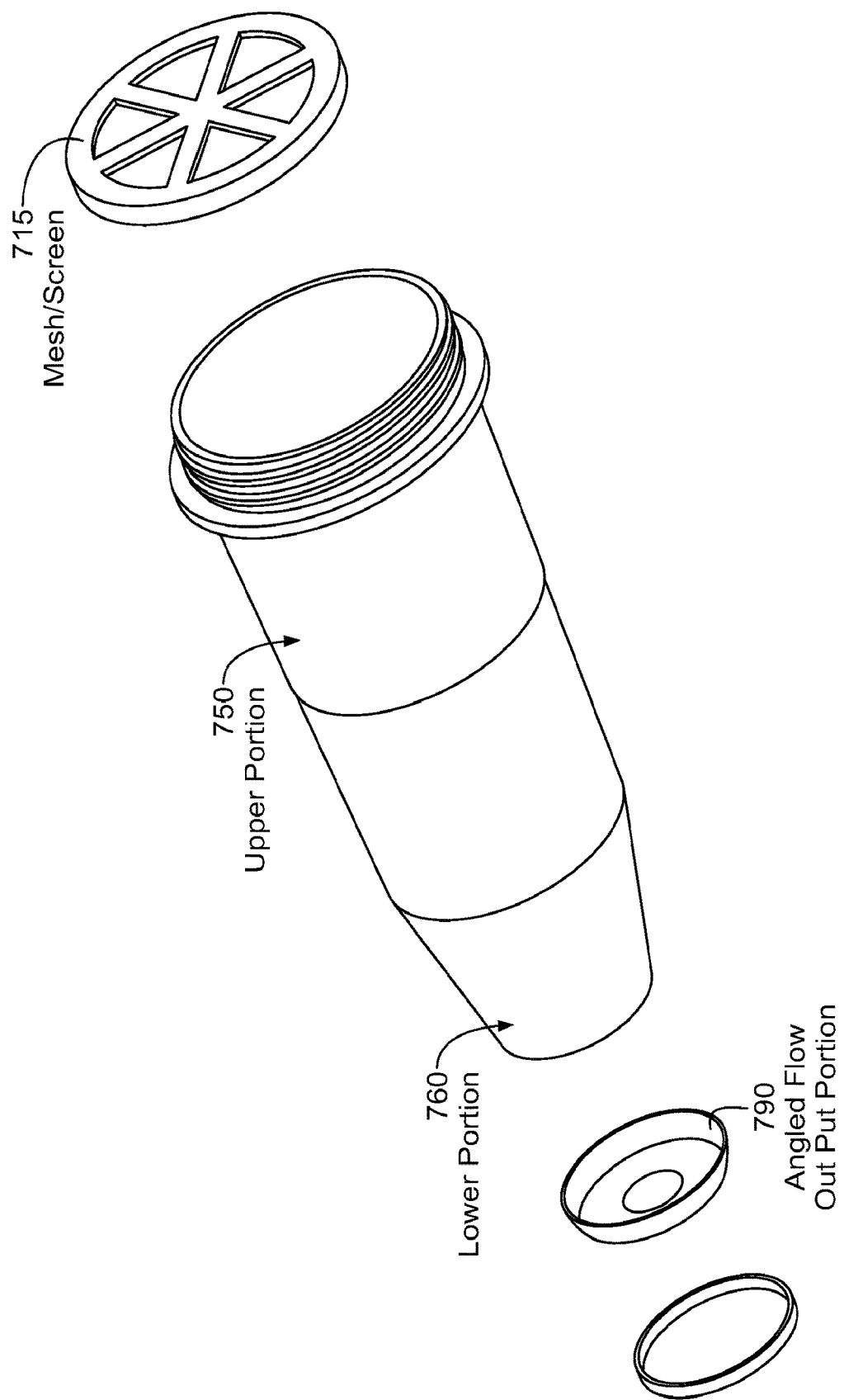
FIG. 7C illustrates an example filter cartridge used in a personal water bottle in accordance with the claimed invention.
Figure 8:
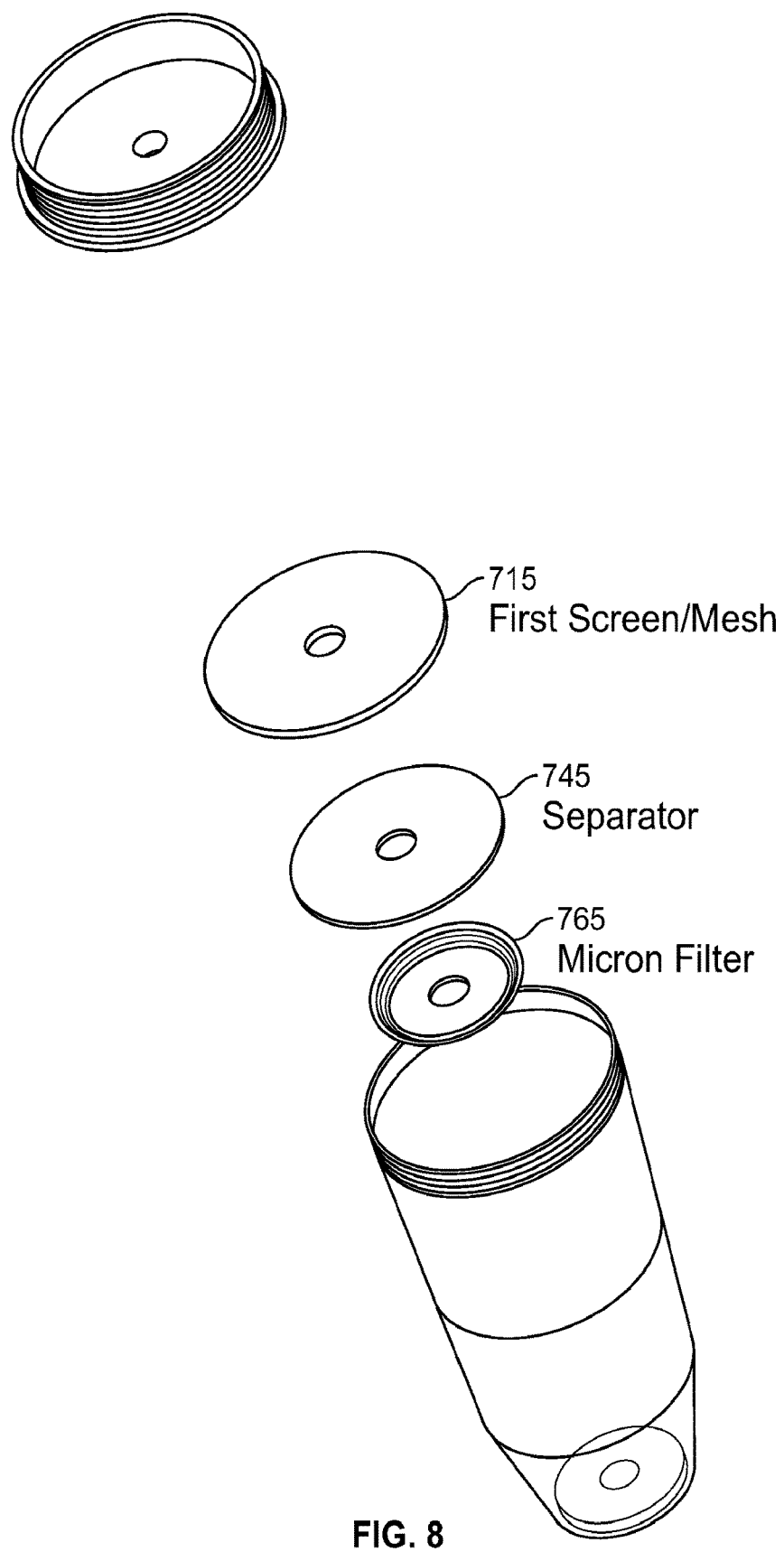
FIG. 8 shows an exploded view of filter components used in a personal water bottle in accordance with the claimed invention.

FIGS. 7A-7B show cross sectional views of the filter cartridge 710 with a number of filtration layers and screens or mesh separators. For example, the first screen or mesh 715 is provided at the top of the filter cartridge 710 and is designed and manufactured to evenly distribute the water across the surface area of the filter layers. One example of the screen/mesh is a polypropylene screen. The even flow of water through the filter prevents channeling within the filter. Channeling occurs when the water or other liquid passes through a less-resistant path of the filter media. That is, a channel is formed within the filter media by repeated flow through a particular area with reduced contact time with the components of the filter media. The first screen/mesh 715 is shown in exploded views in FIGS. 7C and 8. The first screen/mesh 715 is also designed and manufactured to contain the underlying layers of filtration media and to prevent the underlying layers of filtration media from shifting.

An activated carbon layer is incorporated in the filter cartridge. As shown in FIGS. 7A-7B, the activated carbon layer 725 can be positioned as a beginning filter stage in the filter cartridge 710. For example, the activated carbon layer 725 can be placed at or near the very beginning of the filtering process. The activated carbon layer 725 is designed and manufactured to remove organic elements from the unfiltered water. The activated carbon layer 725 can be a powdered, granular, or carbon block material.

As shown in FIGS. 7A-7B, a redox alloy layer 735 is also incorporated in the filter cartridge 710. The redox alloy layer 735 can be positioned immediately below the carbon layer 735, or it could be mixed into the carbon layer. The redox alloy layer 735 is designed and manufactured to prevent the growth of mold, mildew, or bacteria in the water, in the filter cartridge, and in the filter materials. One example of the redox alloy layer 735 includes a KDF (Kinetic Degradation Fluxion media) alloy, or other high purity alloys of copper and zinc. One example of the redox alloy layer includes flaked or granulated particulates.

As shown in FIGS. 7A-7B, a separator 745 can be used below the redox alloy layer 735. Separator 745 is designed and manufactured to diffuse the water as it is filtered and to evenly distribute the water across the surface area of the filter layers. The even flow of water through the filter prevents channeling within the filter. The separator 745 is shown in exploded views in FIGS. 7C and 8. One example of the separator is a polypropylene screen. The separator 745 is also designed and manufactured to contain the underlying layers of filtration media and to prevent the overlying and underlying layers of filtration media from co-mingling.

A mixed bed ion-exchange resin 755 is also included in the filter cartridge 710. The mixed bed ion-exchange resin 755 is designed and manufactured to eliminate inorganic elements among other things. One example of the mixed bed ion resin includes approximately one-half anions and one-half cations. The mixed bed ion resin includes a highly developed structure of pores. On the surface of the pores, there are sites with easily trapped and released ions. The trapping of ions takes place with simultaneous releasing of other ions. That is known as the ion-exchange. Cations can be replaced with hydrogen ions, and anions can be replaced with hydroxyls. The hydrogen ions and the hydroxyls can recombine producing water molecules. Additionally, as described below, a color change resin can be included in the mixed bed resin that indicates expiration of the filter. The color change resin can be included in the mixed bed resin and positioned in the filter 710 so that it can be easily be seen without disassembling or otherwise taking apart the personal water bottle. For example, the color change resin can be viewed through one or more transparent "windows" positioned on the filter and on the personal water bottle. In this fashion, an easy indication of the filter's effectiveness can be determined.

A micron filter layer 765 is also included in the filter cartridge 710. In the examples shown in FIGS. 7A, 7b, and 8, the micron filter layer 765 is a one micron filter, such as a non-woven one micron cloth, for example. The micron filter layer 765 is often positioned at the end of the filtration process. However, the micron filter layer 765 can also be placed at other positions (stages) in the filter cartridge 710, such as at the very beginning The micron filter layer 765 is designed and manufactured for a dual purpose. The micron filter layer 765 eliminates the discharge of carbon dust or other filtration media into the output (filtered) water and further filters out elements larger than one micron, such as cysts, contaminants, and other elements, for example. The micron filter layer 765 also provides an additional level of stability and containment of the filtration media.

Figure 5:
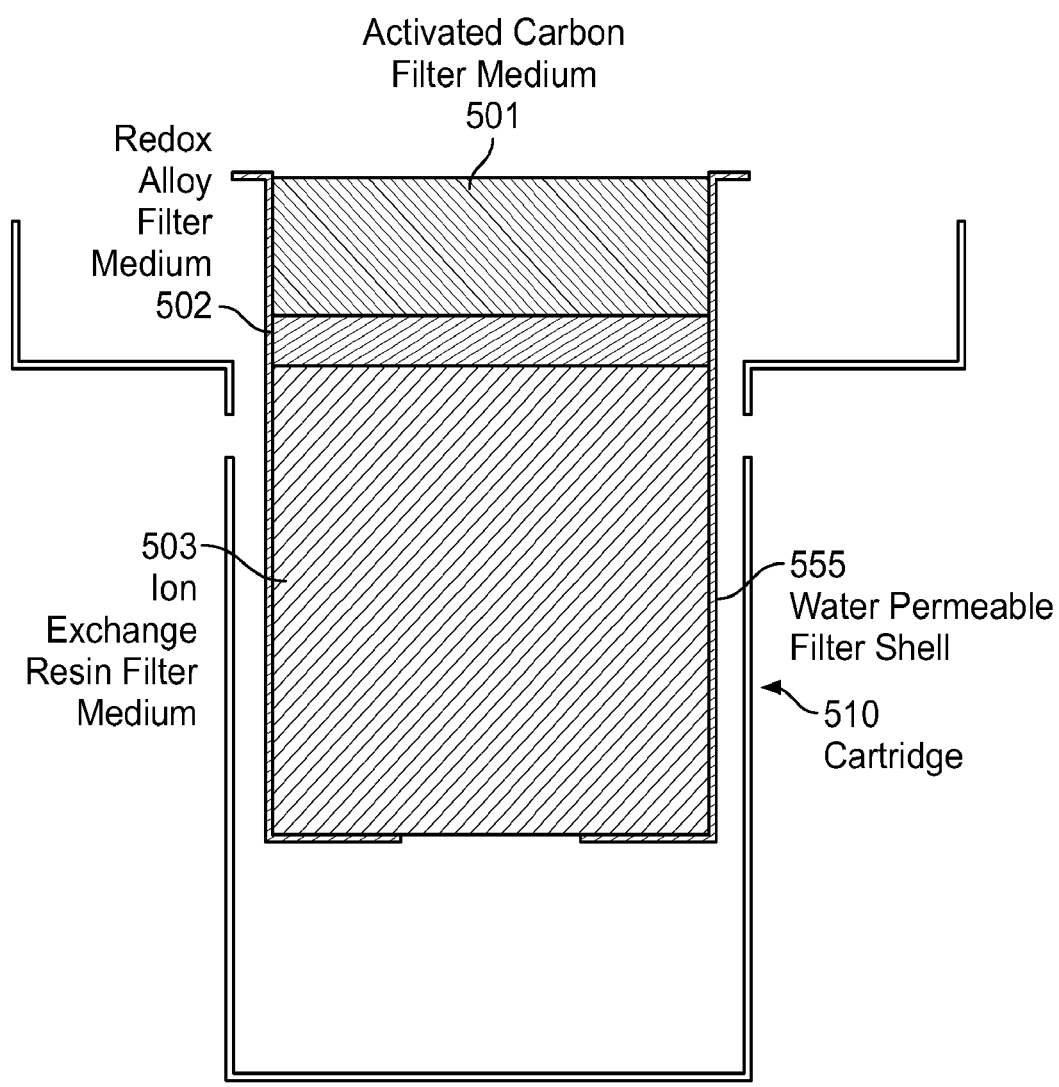
FIG. 5 illustrates a water permeable material as a filter shell in accordance with the claimed invention.

Additional dividers can also be added between the filter layers to further eliminate inter-mixing of filter media and to further promote the even flow of water through the filter. As outlined above, the even flow of water through the filter prevents channeling within the filter Water Permeable Filter Bag The devices of the claimed invention also include a water permeable material as a filter shell 555 as shown in FIG. 5. The water permeable filter shell 555 can be used to house the filter media 501, 502, 503 in the cartridge 510. For example, filter medium 501 can include an activated carbon layer, filter medium 502 can include a redox alloy layer, and filter medium 503 can include an ion-exchange resin. Rather than replacing entire filter cartridges, the water permeable "bags" of the claimed invention can be inserted into the shell of the cartridge 510 and can be removed from the cartridges 510 and replaced when the filter shells 555 (bags) reach the end of their useful life. The use of the water permeable shells 555 reduces waste and provides a much more environmentally friendly and lower cost product by using far less plastic in its disposable parts. The water permeable membranes (bags) 555 are manufactured for use in many different cartridge configurations, including top fill, gravity feeding cartridges with output ports of any configuration.

Filter Expiration Indicators

Color change resins, an electronic filter change indicator, and a built-in TDS meter provide a number of new ways in which a user can determine if the filter materials have expired.

Color Change Resins

The inclusion of color change resins in the filter in the water filtration devices of the claimed invention provides a simple and effective way for a user to determine if the filter materials have expired and need to be replaced. A color change resin is added to the mixed bed resin to indicate expiration of the filter. As the mixed bed resin expires, the pH of the water becomes more acidic. An acid-base indicator or litmus-type of color change element is added to the resin to indicate when the pH has changed. As the pH of the water becomes more acidic (low pH), the resin with the added acid-base indicator responds to the change in the hydrogen ion concentration and turns color to indicate the change in pH. The color change filter resin provides an immediate visual indication to users of the pH level in the resin and allows users to quickly and simply determine if a filter is expired. No additional tools or meters are needed to make the determination, resulting in a low cost method of evaluating the filter effectiveness. The color change resins are manufactured for use in many cartridge configurations, including top fill, gravity feeding cartridges with output ports of any configuration.

Filter Change Indicator

Figure 6:
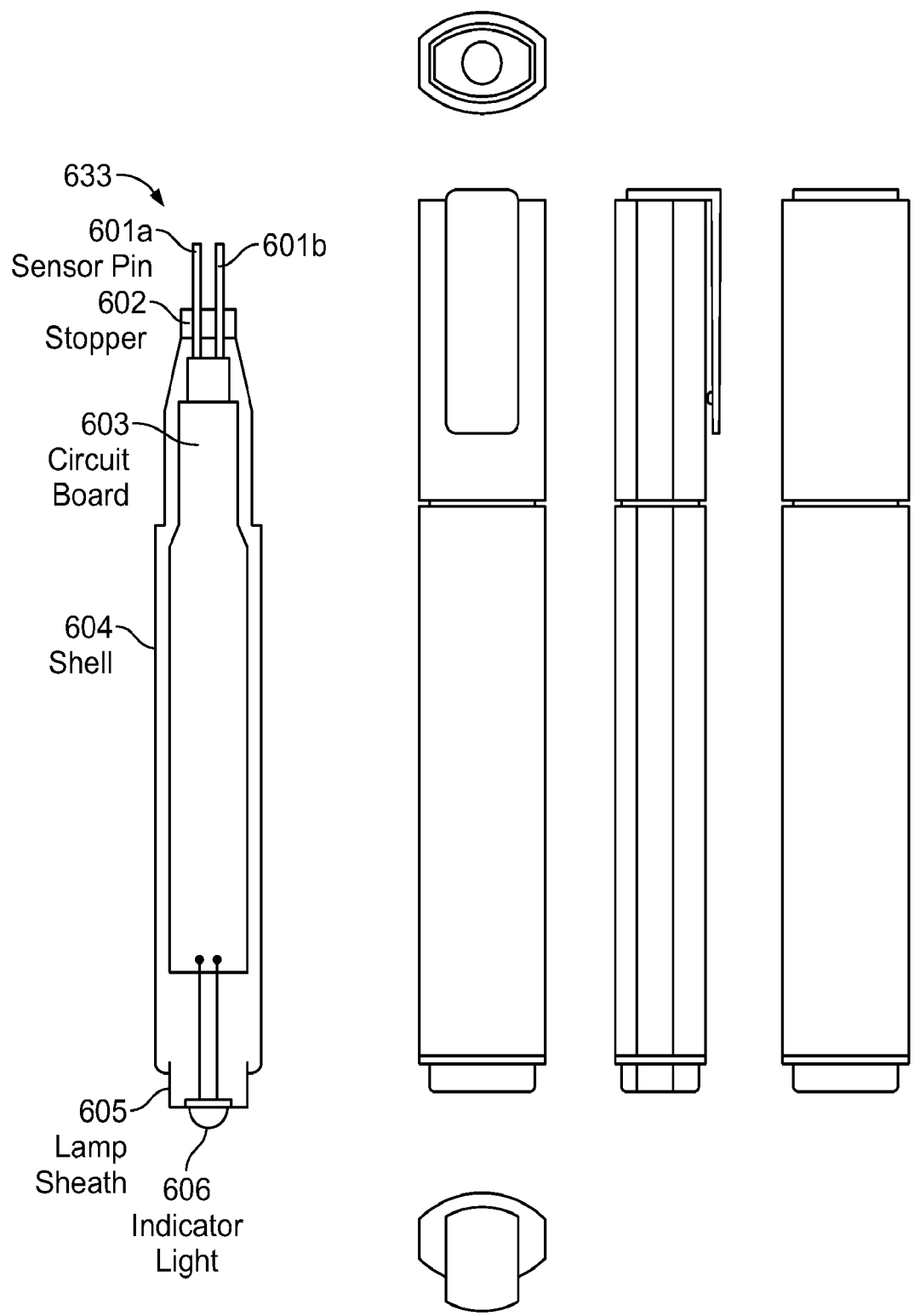
FIG. 6 shows a filter change indicator in accordance with the claimed invention.

Similarly, a new type of filter expiration indicator assists users in determining when a filter should be replaced. For example, the filter change indicator 633 shown in FIG. 6 is used to measure the effectiveness of filter cartridges and filter materials. Conductivity is created or otherwise increases when water becomes more acidic as the mix of charcoal and ion exchange resins begins to expire. When conductivity of the filtered water is greater than a predetermined level, such as zero, for example, the filter is no longer functioning effectively and requires replacement. The filter change indicator 633 measures conductivity of the filtered water and provides a visual indication when conductivity is greater than the predetermined level. For example, sensor pins 601$a$, 601$b$ of the filter change indicator 633 are placed in a sample of filtered water. The stopper 602 of the filter change indicator 633 prevents the water sample from infiltrating the filter change indicator 633. Circuit board 603 is configured and manufactured to include a comparator and an RC circuit to measure conductivity between the sensor pins 601$a$, 601$b$. When sensor pins 601$a$, 601$b$ measure conductivity greater than the predetermined level, the circuit board 603 illuminates indicator light 606 to indicate that the filter is expired.

Built-in TDS Meter

Similarly, a new type of housing in the lid, handle, or body of a water pitcher provides a convenient storage mechanism with which to secure and hold a TDS (total dissolved solids) meter. The TDS meter indicates the total dissolved solids of the filtered water, that is, the concentration of dissolved solids remaining in the water after filtration. Dissolved ionized solids such as salts and minerals increase the conductivity of the water, and the TDS meter measures the conductivity of the solution and determines the TDS from the conductivity measurement.

Figure 9:
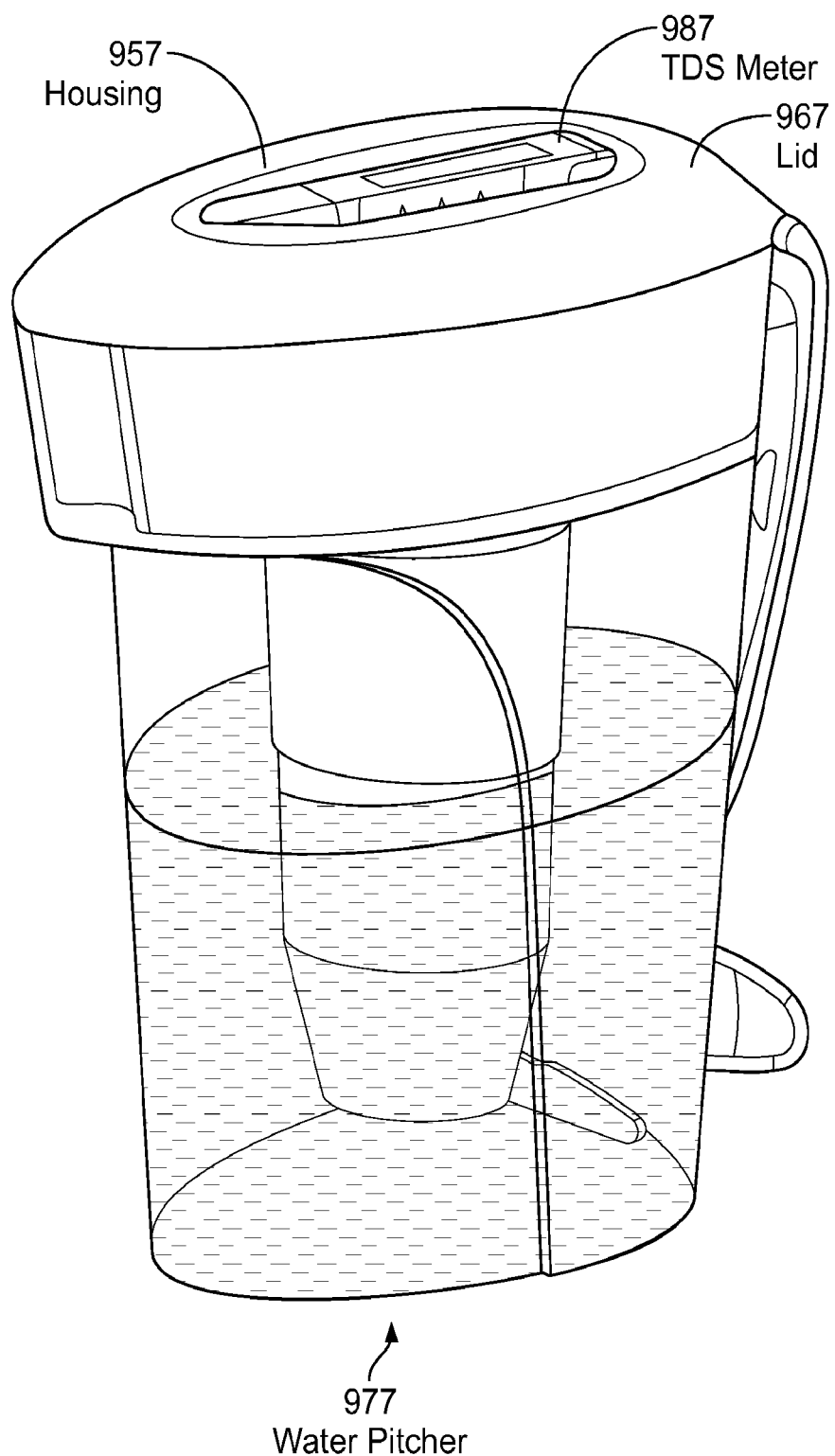
FIG. 9 illustrates a water pitcher incorporating a built-in TDS meter in accordance with the claimed invention.

In one example of the claimed invention, an improved TDS (total dissolved solids) meter is built-in to water pitchers and other dispensers for use in testing the filtered water. As shown in FIG. 9, the water pitcher 977 includes a housing 957 in the lid 967 of the pitcher to receive and hold a TDS meter 987. The TDS meter 987 measures the effectiveness of filter cartridges and filter materials. When a filter is beyond its effective lifespan, total dissolved solids can remain in the filtered water after filtration. The water becomes more acidic as the mix of charcoal and ion exchange resins begins to expire. When the total dissolved solids of the filtered water is greater than zero, the filter is no longer functioning effectively and requires replacement. The built-in TDS meter 987 measures total dissolved solids of the filtered water and provides a visual indication when the total dissolved solids are greater than zero. By configuring the water pitcher 977 with a built-in TDS meter 987, users can quickly and accurately determine when a filter needs to be replaced.

Additional Resin Washing Process

An additional washing process in accordance with the claimed invention is used to provide improved flavor and smell of the filtered water as the filter is used over time. For example, by further washing the resin prior to assembling the filter, VOC (volatile organic compound) levels can be reduced to below 1 ppb (one part per billion). The resins can be washed with volumes of demineralized water, for example. The resins are then tested repeatedly to ensure that VOC levels are maintained below 1 ppb. By reducing the VOC levels to below 1 ppb, the claimed invention minimizes the potential for amine smell upon expiration or near expiration of the filter. As with all VOCs, amines have a high vapor pressure at room temperature, and large numbers of amine molecules evaporate or sublimate from the compound and enter the surrounding air. Many other combinations of mixed bed resins would typically leave a bad taste initially, and that taste would be even worse upon filter exhaustion or near exhaustion because many mixed bed resins are not designed for filtering drinking water. The combination of extensive washing and testing for max VOC levels ensures the water output of the filters of the claimed invention have a clean taste. The extensive washing and testing of the resins is performed for many cartridge configurations, including top fill, gravity feeding cartridges with output ports of any configuration.

The example embodiments of the claimed systems, devices, and methods of filtering liquids prevent clogging of filters due to air-locks, provide filter cartridges with improved performance, provide improved taste of the filtered water, and make the use of the filter systems easier for customers.

We claim:

1. A water filter cartridge comprising:
an open top end, a sidewall extending from the open top end to a bottom output end, wherein the open top end of the filter cartridge receives unfiltered water and that opens into a filter cavity that houses a filter layer;
the filter layer that is defined by an unfiltered water end located at the open top end of the sidewall, a filter sidewall extending from the unfiltered water end to a filtered water end spaced above the bottom output end, wherein the filter sidewall houses filter elements and receives unfiltered water at the unfiltered water end from the open top end of the filter cartridge sidewall and filters the water as the water passes through the filter elements; and
a dome shaped lid with an outer diameter smaller than an inner diameter of the filter cavity and positioned at the open top end of the water filter cartridge and above the filter layer that receives unfiltered water from the open top end of the water filter cartridge, passes the unfiltered water to the filter layer, and floats upward in the filter cavity as the open top end of the filter cartridge receives unfiltered water and floats downward in the filter cavity as the water passes through the filter layer to eliminate air locks in the filter layer.

2. The water filter cartridge of claim 1, wherein the dome shaped lid includes a float valve that opens as the filter cartridge receives unfiltered water and closes as the unfiltered water passes through the filter layer.

3. The water filter cartridge of claim 1, wherein the dome shaped lid includes a vent through which air from the filter cartridge escapes as the dome shaped lid moves downward as the unfiltered water passes through the filter layer, preventing air locks in the filter.

4. The water filter cartridge of claim 1, wherein the dome shaped lid includes a perforation through which the unfiltered water is received and passed to the filter elements.

5. The water filter cartridge of claim 1, wherein the filter elements include:
a carbon layer for removing at least one of chlorine or organic contaminants from the unfiltered water;
a redox alloy layer for neutralizing pH in the water;
an ion exchange layer for removing at least one of inorganic and radiological contaminants in the water; and
a micron filter layer.

6. The water filter cartridge of claim 5, wherein the water filter cartridge includes a porous separator for removing impurities from water and regulating water flow through the filter elements.

7. The water filter cartridge of claim 5, wherein the bottom output end of the water filter cartridge includes a flow control output port.

8. The water filter cartridge of claim 7, wherein the flow control output port has a smaller cross sectional area than the open top end of the water filter cartridge.

9. The water filter cartridge of claim 5, wherein the ion exchange layer includes a mixed bed of cationic and anionic resins.

10. The water filter cartridge of claim 5, wherein the ion exchange layer includes a water softener.

11. The water filter cartridge of claim 5, wherein the ion exchange layer includes a color change resin.

12. The water filter cartridge of claim 1, wherein the water filter cartridge is a gravity-fed filter.

13. The water filter cartridge of claim 1 further comprising:
a food safe foam configured to prevent filter medium spillage out of the filter cartridge and to provide even water flow at the filter layer.

14. The water filter cartridge of claim 1 further comprising:
a middle disk located in the filter layer that provides rigidity and stability to the filter layer and that covers a cross sectional area of the filter layer to prevent clogging of the filter cartridge.

15. The water filter cartridge of claim 14, wherein the middle disk separates at least two filter element layers.

16. The water filter cartridge of claim 14, wherein the middle disk includes legs that extend from a planar portion of the middle disk.

17. The water filter cartridge of claim 16, wherein the legs of the middle disk extend vertically along the filter sidewall from an outermost point of the planar portion of the middle disk to provide vertical stability for the middle disk and to keep the planar portion of the middle disk substantially perpendicular to the filter sidewall.

18. The water filter cartridge of claim 14, wherein the middle disk includes a float valve.

19. The water filter cartridge of claim 7, wherein the flow control output port provides a flow rate of filtered water of 180-200 cc/min.

20. The water filter cartridge of claim 1, wherein the water filter cartridge includes a water permeable filter bag that houses the filter elements.

* * * * *